US008582479B2

(12) United States Patent
Lim et al.

(10) Patent No.: US 8,582,479 B2
(45) Date of Patent: Nov. 12, 2013

(54) METHOD AND SYSTEM FOR TRANSMITTING AND RECEIVING CONTROL INFORMATION IN BROADCASTING COMMUNICATION SYSTEM

(75) Inventors: Yeon-Ju Lim, Seoul (KR); Hwan-Joon Kwon, Gyeonggi-do (KR); Hak-Ju Lee, Incheon (KR); Hong-Sil Jeong, Seoul (KR); Jae-Yoel Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 377 days.

(21) Appl. No.: 12/812,178

(22) PCT Filed: Jan. 8, 2009

(86) PCT No.: PCT/KR2009/000093
§ 371 (c)(1),
(2), (4) Date: Oct. 12, 2010

(87) PCT Pub. No.: WO2009/088230
PCT Pub. Date: Jul. 16, 2009

(65) Prior Publication Data

US 2011/0026447 A1 Feb. 3, 2011

(30) Foreign Application Priority Data

Jan. 8, 2008 (KR) ........................ 10-2008-0002361
Jan. 16, 2008 (KR) ........................ 10-2008-0005061

(51) Int. Cl.
*H04B 7/00* (2006.01)

(52) U.S. Cl.
USPC .......................................................... 370/310

(58) Field of Classification Search
None
See application file for complete search history.

(56) References Cited

U.S. PATENT DOCUMENTS

| | | | |
|---|---|---|---|
| 6,158,715 | A | 12/2000 | Kirschbaum |
| 2006/0262744 | A1 | 11/2006 | Xu et al. |
| 2008/0276287 | A1 | 11/2008 | Mizuta |

FOREIGN PATENT DOCUMENTS

| | | |
|---|---|---|
| EP | 0 827 312 | 3/1998 |
| JP | 10-507045 | 7/1998 |
| JP | 2006-340218 | 12/2006 |
| JP | 2006-345493 | 12/2006 |
| JP | 2008-501251 | 1/2008 |
| KR | 1020050021581 | 3/2005 |
| WO | WO 2005041495 | 5/2005 |
| WO | WO 2007039023 | 4/2007 |

OTHER PUBLICATIONS

DVB Organization: Report from TM-T2 to TM-73, Digital Video Broadcasting, XP 017817581, Nov. 19, 2007.
Teracom/Nokia, “Considerations of the Robustness of L1/L2 Signalling for DVB-T2”, Digital Video Broadcasting, XP 017817496, Sep. 15, 2007.

(Continued)

*Primary Examiner* — John Blanton
(74) *Attorney, Agent, or Firm* — The Farrell Law Firm, P.C.

(57) ABSTRACT

Disclosed is a method and an apparatus for transmitting and receiving control information for receiving a service in a broadcast communication system. The method includes inserting first control information for receiving at least one different service at a next frame in each of multiple service data pieces of a current frame and transmitting a frame including the first control information, making it possible to efficiently transmit and receive a frame, which includes multiple services configured through a combination of one or more radio frequencies, and thereby enabling rapid receiving of a switched service in the case of service switching.

30 Claims, 14 Drawing Sheets

(56) References Cited

OTHER PUBLICATIONS

Panasonic, "On L1 Signaling", Digital Video Broadcasting, XP 017817278, Oct. 15, 2007.

DVB Organization: "T2 SSS 010 Draft Baseline SSS Section r001.doc", Digital Video Broadcasting, XP 017817495, Sep. 15, 2007.

ETSI: "Frame Structure Channel Coding and Modulation for a Second Generation Digital Terrestrial Television Broadcasting System (DVB-T2)", XP 002523675, Digital Video Broadcasting Document A122R1, Jan. 2008.

METHOD AND SYSTEM FOR TRANSMITTING AND RECEIVING CONTROL INFORMATION IN BROADCASTING COMMUNICATION SYSTEM

PRIORITY

This application claims priority under 35 U.S.C. §119(a) to Korean Patent Applications Serial No. 10-2008-0002361 and 10-2008-0005061, filed in the Korean Intellectual Property Office on Jan. 8, 2008 and Jan. 16, 2008, respectively, and to PCT/KR2009/000093 filed Jan. 8, 2009, the entire contents of each which is incorporated herein by reference.

BACKGROUND OF THE INVENTION

1. Field of the Invention

The present invention relates to a method and an apparatus for transmitting and receiving control information in a broadcast communication system and, more particularly to a method and an apparatus for transmitting and receiving control information about a frame, which includes multiple services, in a broadcast communication system.

2. Description of the Related Art

In our 21$^{st}$ century information society, broadcast communication services are digitized, and multi-channel, high-quality broadband service is provided. The recent increase in the spread of high screen quality digital televisions (TVs), Portable Multimedia Players (PMPs), and portable broadcast devices has caused an increasing demand for the support of various receiving schemes in the digital broadcast service.

In order to fulfill such a demand, the Digital Video Broadcasting-Terrestrial (DVB-T2), which is a second generation European terrestrial wave digital broadcast standard, is preparing standards for a receiving scheme reusing the conventional home digital receiving antenna, a receiving scheme using multiple antennas in order to increase capacity, and a receiving scheme for a portable mobile terminal, respectively. DVB-T/H, which is a first generation terrestrial wave digital broadcast standard, takes only the two schemes including a stationary receiving scheme and a mobile receiving scheme into consideration. However, the DVB-T2 also includes a scheme of using multiple antennas, and considers a physical layer structure and a change of control information according to the physical layer structure as a main standardization job.

In the physical layer structure of the DVB-T2, a control channel is a channel for transmitting a control message with respect to a transmission scheme in the physical layer. In the control channel, a basic unit of a transmitted signal is a frame, which may include multiple services, and includes a service index, location information, a modulation scheme/coding rate, and a cell identifier (ID) of each service. In the control channel, the service configuration and related information may be different according to each frame. Therefore, for each frame, the control channel is transmitted separately from the data channel.

Referring to FIG. 1, a transmitter 102 transmits different broadcast services in multiple Radio Frequency (RF) bands, respectively, and a receiver 104 tunes to an RF containing a desired service and receives the desired service. For example, when the receiver 104 wants to receive the service 1, the receiver 104 tunes to RF #1, obtains information, such as location information and modulation/coding scheme, relating to the service 1, and then decodes the service 1.

Referring to FIG. 2A, the transmitter 202 divides a service (corresponding to each service in FIG. 1), which includes an existing long packet configured by combining multiple RFs, into multiple short sub-slots, and then transmits the divided sub-slots through multiple RF bands. The receiver 204 detects the location of a pertinent service in each RF band including a desired service through the control information and then receives the pertinent service. In receiving the service 1, the receiver 204 decodes the pertinent services in an order capable of receiving the sub-slots in the time domain, i.e., in the order of RF1, RF4, RF3, and RF2. Therefore, for the same quantity of service, transmission of a smaller quantity of data through multiple frequencies is expected to be capable of achieving more time and frequency diversity gains than simultaneous transmission of a large quantity of data by using a fixed RF for each service. Such a frame configuration scheme as described above is called Time-Frequency Slicing (TFS).

In the structure shown in FIG. 2B, ten service packets are transmitted through four RFs. In such a TFS frame, all service packets are first allocated to one RF, and packets cyclic-shifted from the initial group of all the service packets are then allocated to an adjacent RF. When four RF bands are used as shown in FIG. 2B, one service is transmitted through four RFs (RF1~RF4). Therefore, each service basically includes four sub-slots. However, as in the service 3, the service may include five sub-slots due to the cyclic shift.

Referring to FIG. 2B, a P1 signal 201 and a P2 signal 203 are transmitted at the initial portion of each frame. The P1 signal 201 may be used as a preamble for synchronization, and the P2 signal 203 transmits control information for each service included in the current or next frame. The control information includes location information indicating the start point and the terminating point of data of each service. When the receiver switches the service channel while receiving the service, the receiver can receive the switched service only after acquiring the control information of the switched service.

FIG. 3 illustrates conventional service switching. When multiple frames (frame n, . . . , frame n+3) are being transmitted in the time domain, each frame includes a P2 signal 303 to 311 at the initial portion thereof and multiple services following the P2 signal. The frame may be transmitted in the FF mode or TFS mode, as shown in FIG. 1 or 2. However, for convenience of description, transmission in the FF mode will be taken into consideration in the following description. Further, for convenience of description, it is assumed that the P2 signal indicates control information of the current frame.

Referring to FIG. 3, when the receiver switches the channel to another service while receiving a service at frame n (301), the receiver decodes the P2 signal for receiving the switched service at the next frame. Since the P2 signal 305 includes the scheduling information at frame (n+1), the receiver is unable to receive the switched service at frame (n+1) if the receiver fails to decode the P2 signal 305. Further, if the receiver continuously fails to decode the P2 signal, that is, if the receiver fails to decode not only the P2 signal 305 but also the P2 signal 307 of frame (n+2), the receiver receives the switched service at frame (n+3) by using the control information 313 acquired from the P2 signal 309 of frame (n+3).

According to the conventional systems described above, when a service switching occurs, the zapping time from the time point of the service switching to the time point of reception of the switched service may be too long according to whether the decoding of the P2 signal is a success or failure. Therefore, there has been a request for a scheme for transmitting and receiving control information of switched service so that the receiver can efficiently receive the switched service when a service switching has occurred.

SUMMARY OF THE INVENTION

Accordingly, the present invention has been made to solve the above-mentioned problems, and the present invention provides a method and an apparatus for efficiently transmitting and receiving control information for receiving a service in a broadcast communication system.

Also, the present invention provides a method and an apparatus for efficiently transmitting and receiving service data including control information for receiving a service in a broadcast communication system.

The present invention also provides a method and an apparatus for transmitting and receiving control information of a switched service to enable efficient reception of the switched service, in response to the occurrence of a service switching in a broadcast communication system.

SUMMARY OF THE INVENTION

In accordance with an aspect of the present invention, there is provided a method of transmitting control information in a broadcast communication system, the method including the steps of inserting first control information for receiving at least one different service at a next frame in each of multiple service data pieces of a current frame; and transmitting a frame including the first control information.

In accordance with another aspect of the present invention, there is provided a method of receiving control information in a broadcast communication system, the method including the steps of receiving a current frame including multiple service data pieces in each of which first control information for receiving at least one different service at a next frame is inserted; acquiring the first control information from the received current frame when a service switching occurs; and receiving service data of the switched service by using the first control information.

In accordance with yet another aspect of the present invention, there is provided an apparatus for transmitting control information in a broadcast communication system, the apparatus including a control information processing unit for generating first control information for receiving at least one different service at a next frame and inserting the first control information in each of multiple service data pieces of a current frame; and a transmission unit for configuring a frame including the first control information in a predetermined format and transmitting the frame.

In accordance with a further aspect of the present invention, there is provided an apparatus for receiving control information in a broadcast communication system, the apparatus including a frame receiving unit for receiving a current frame including multiple service data pieces in each of which first control information for receiving at least one different service at a next frame is inserted; a service switching determiner for determining if a service switching to another service occurs during receiving of a service at the current frame; and a service decoder for acquiring the first control information from the received current frame when the service switching occurs, and receiving service data of the switched service by using the first control information.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE PREFERRED EMBODIMENTS

Hereinafter, embodiments of the present invention will be described with reference to the accompanying drawings. In the following description, a detailed description of known functions and configurations incorporated herein will be omitted to avoid making the subject matter of the present invention unclear.

The present invention provides a signaling technique by which, in the case of the occurrence of a service switching due to user's switching of the service channel that the user wants to receive, even when a receiver has failed to decode a P2 signal including control information, the receiver can acquire control information of the next frame. Specifically, the present invention provides an in-band signaling scheme in which service data of a transmitted frame includes control information indicating scheduling information of the frame.

In the in-band signaling, the service type is divided into an anchor service, a primary service, and a secondary service, and the control information transmitted through each service has different configurations according to the service type. Further, by appointing the number of primary services, signaling is performed based on the result of a comparison between the total number of the services transmitted through frames and the predetermined number of primary services.

Figure 1:
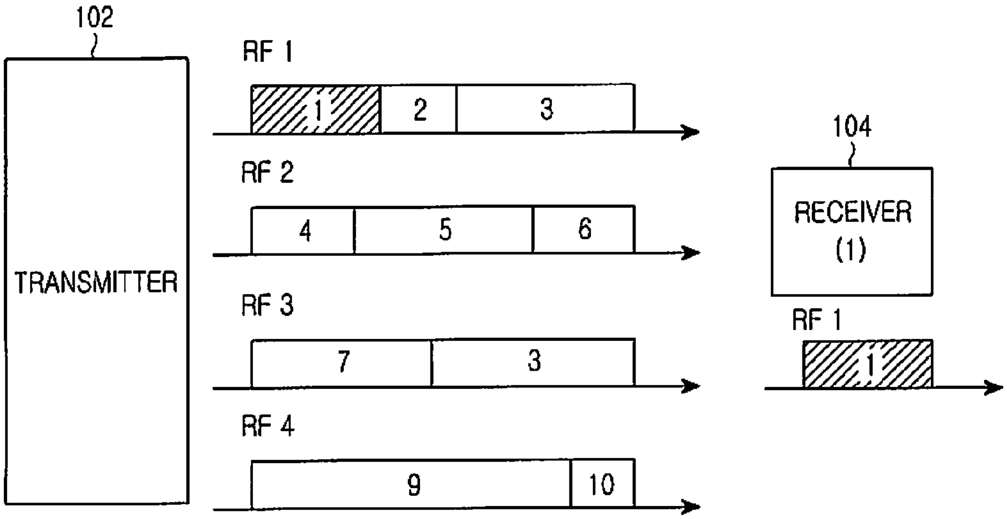
FIG.1 (PRIOR ART)
FIG. 1 illustrates a conventional scheme of transmitting and receiving a broadcast service according to a Fixed Frequency (FF) mode in the $1^{st}$ generation broadcast system.
Figure 2A:
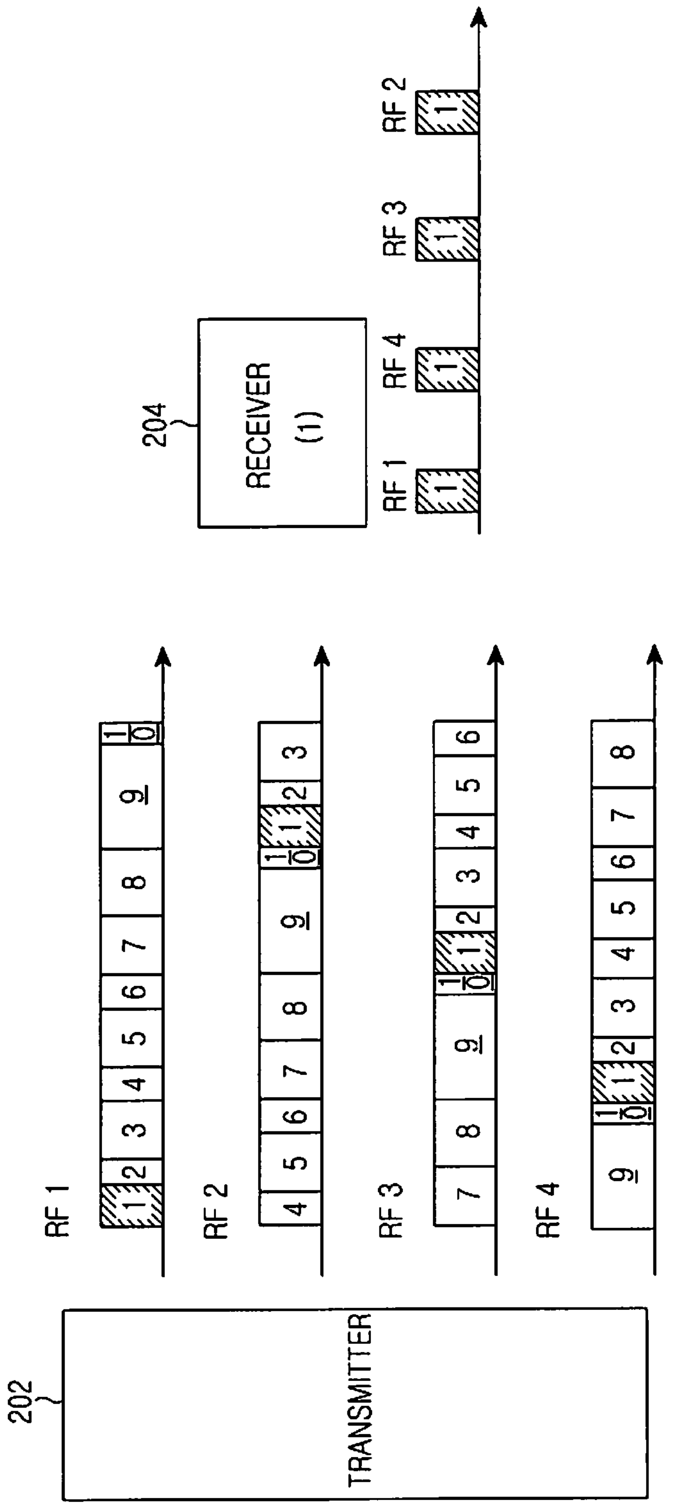
FIG.2A (PRIOR ART)
FIG. 2A illustrates a scheme of transmitting and receiving a broadcast service in the conventional $2^{nd}$ generation broadcast communication system.
Figure 2B:
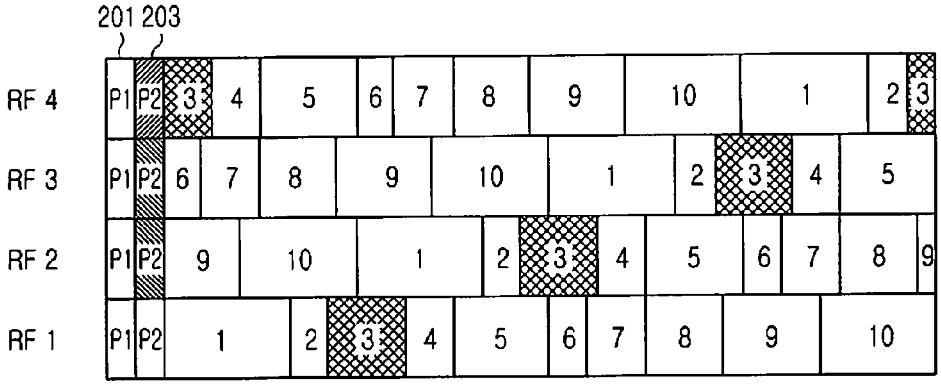
FIG.2B (PRIOR ART)
FIG. 2B illustrates a transmission frame standard of the conventional TFS.
Figure 3:
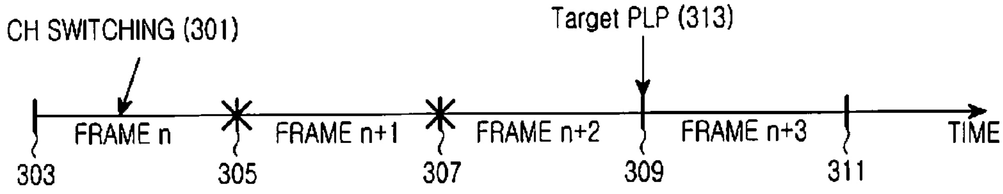
FIG.3 (PRIOR ART)
FIG. 3 illustrates conventional service switching.
Figure 4A:
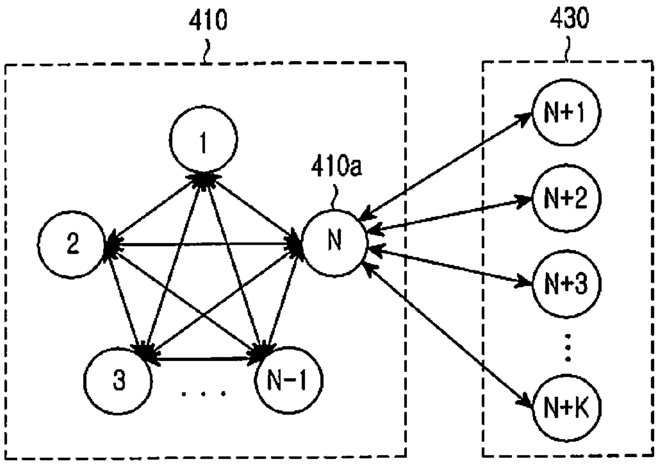
FIG. 4A illustrates a configuration of control information transmitted through each service according to service type when multiple services are transmitted according to a first embodiment of the present invention.

Referring to FIG. 4A, based on an assumption that a total of (N+K) services are transmitted through frames, N primary services (1 to N services) 410 and K secondary services ((N+1) to (N+K) services) 430 exist, and one service from among the N primary services 410 is appointed as an anchor service 410*a*.

As noted by the arrows between the N primary services in FIG. 4A, each of the N primary services include scheduling information relating to all the other primary services as well as itself. One primary service from among the N primary services is appointed as the anchor service, and the anchor service includes not only the scheduling information of all the primary services but also scheduling information of the K secondary services. Meanwhile, the secondary services transmit scheduling information of the anchor service including themselves.

Therefore, when the total number of transmitted services does not exceed N, all the transmitted services become primary services and each transmitted service includes scheduling information of all the services. Meanwhile, when the total number of transmitted services exceeds N, that is, when (N+K) and K secondary services exist as well as the primary services, one service is determined as the anchor service from among the N primary services, and the anchor service includes control information of all the services including the primary services and the secondary services.

Figure 4B:
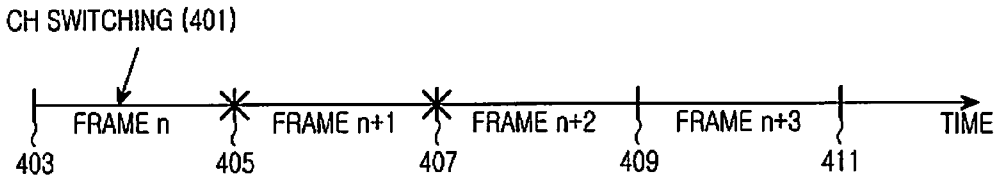
FIG. 4B illustrates a switching from an existing service to a target service in a service switching according to the first embodiment of the present invention.

In FIG. 4B, a service is transmitted through a Packet Layer Pipe (PLP), which is a Time Division Multiplexing (TDM) channel, and a target/anchor PLP refers to a target/anchor service. However, the present invention is not limited to the case of using the PLP and is also applicable to other types of services.

In FIG. 4B it is assumed that each of the P2 signals 403 to 411 includes control information of a current frame, and the control information included in the service data indicates scheduling information of a next frame. Also, it is assumed that the number N of primary services is 30. Further, it is assumed that decoding of the P2 signals 405 and 407 of frames (n+1) and (n+2) has been proved a failure.

First, if the number of transmitted services does not exceed the number N of the primary services, when a service switching occurs at frame n (401), the service received at frame n becomes a primary service and the receiver acquires control information of a target service by decoding of the primary service. That is, since the control information acquired through an in-band signaling at frame n indicates control information of the next frame, the receiver can instantly receive the switched service at frame (n+1). As a result, when decoding of the two continuous P2 signals 405 and 407 is a continuous failure, the signaling scheme of the preferred embodiment can achieve a zapping time two frames faster than the conventional signaling scheme depending on only the P2 signal. Even when decoding of the P2 signal 405 is a failure and decoding of the next P2 signal 407 is a success, it is possible to receive the switched service at frame (n+1) instantly after the occurrence of service switching. Therefore, the present signaling scheme can achieve a zapping time one frame faster than the conventional signaling scheme depending on only the P2 signal.

Further, when the total number of transmitted services exceeds N, the receiver acquires control information of the anchor service by decoding the existing service at frame n and acquires control information of the target service by receiving the anchor service at frame (n+1). Therefore, the receiver can receive the switched service from frame (n+2).

Meanwhile, the in-band signaling having a very excellent performance in view of the zapping time corresponds to the case in which each service includes control information of all services. However, since this scheme requires a vary large overhead, there is inevitably a limitation in the number of services capable of satisfying an allowable overhead. For example, 30 services are considered and an overhead for each service is assumed to be 50 bits. When each service includes control information of all the 30 services, the total quantity of the overhead is 45,000 bits (30*(30*50)=45,000), and the overhead ratio is calculated as 0.125. Therefore, the overhead ratio satisfies the below-par value of 0.25, which is the allowable maximum overhead ratio. When extended to two times the number of services, that is, when 60 services are supported, the overhead ratio has a value of 0.5, a value obtained from 60*(60*50)=180,000 bits, which exceeds the threshold, i.e. the allowable maximum overhead ratio. Therefore, the maximum number of supportable services satisfying the overhead threshold is 42.

Therefore, there is a need for a signaling technique that can support as many services as possible while allowing each service to include control information of many services, so as to achieve a good performance in the zapping time.

Figure 5A:
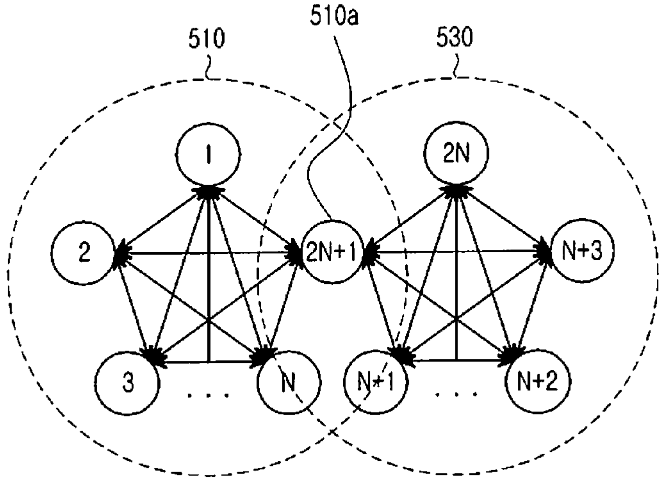
FIG. 5A illustrates a configuration of control information transmitted through each service according to the service type when multiple services are transmitted according to a second embodiment of the present invention.

Referring to FIG. 5A, a total of K services are transmitted and (2N+1) services can be supported by the in-band signaling. The (2N+1) services include one primary service and 2N secondary services. One primary service appointed from among the (2N+1) services includes control information of all the services.

Referring to FIG. 5A, the (2N+1) services are divided into two groups 510 and 530, and the primary service 510*a* belongs to both of the two groups and serves as a connection point between the two groups. Further, when the (2N+1) services are arranged in turn according to the size of the service index, first N secondary services arranged in turn from the service having the smallest index belong to group #1 510, and next N secondary services belong to group #2 530, while the service having the index of (2N+1) is a primary service 510*a* and belongs to both groups. Therefore, each group includes (N+1) services including one primary service and N secondary services. Data of each service includes scheduling information for all the services of the group, to which the service belongs, and the primary service repeatedly belongs to every group. As a result, the primary service includes control information of all the services belonging to all the groups.

In other words, the N secondary services belonging to each group have scheduling information for all the services belonging to the group. That is, each secondary service includes control information of the primary service and all the secondary services including itself belonging to its group. In contrast, the primary service includes control information of all the services including itself belonging to all the groups.

For comparison with the configuration shown in FIG. 4A according to the first embodiment of the present invention, consider a service having a service index of (N+3) belonging to group #2 in the second embodiment of the present invention shown in FIG. 5A. In the first embodiment, the receiver should acquire the control information of a target service through the anchor service, in order to determine if the service having a service index of (N+3) switches to another service within the group including the N services or another service out of the group including the N services. In contrast, according to the second embodiment, for example, in order to perform a service switching from a service having a service index of (N+3) belonging to group #2 to a service belonging to group #1, it is necessary to acquire control information for a target service through a primary service having a service index of (2N+1). However, it is possible to instantly, i.e. without acquisition of additional control information, switch from the service having the service index of (N+3) belonging to group #2 to a target service belonging to the same group, i.e. group #2.

That is, for the service switching between groups, scheduling information for the target service can be obtained through decoding of an additional service, such as the primary service. However, in relation to the service switching within the same group, it is possible to directly obtain scheduling information of the target service without receiving an additional service.

Further, consider the same signaling overhead ratio while maintaining the basic configuration in which each service includes control information of other services. For example, assuming that the maximum number of supportable services capable of satisfying the overhead ratio of below par 0.25% is 42, the second embodiment of the present invention can support a total of 60 services through two groups each including 30 services at an overhead ratio below par 0.25%. Specifically, the quantity of required overhead corresponds to 90,000 bits (2*30*(30*50)=90,000), which is similar to 88,200 bits (42*(42*50)=88,200) when each of the 42 services includes control information of all the services. That is, the configuration shown in FIG. 5A can support 18 more services than the case of supporting 42 services, with nearly the same assumption in view of the signaling configuration and the overhead.

Figure 5B:
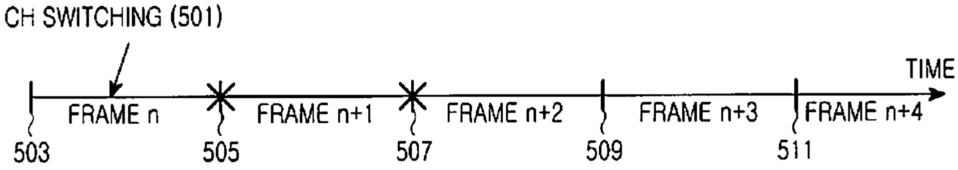
FIG. 5B illustrates a switching from an existing service to a target service in a service switching according to the second embodiment of the present invention.

In FIG. 5B it is assumed that each of the P2 signals 503 to 511 includes control information of a current frame, and the control information included in the service data indicates scheduling information of a next frame. Further, it is assumed that decoding of the P2 signals 505 and 507 of frames (n+1) and (n+2) has been proved a failure. Also, it is assumed that the number of secondary services for each group is N.

Referring to FIG. 5B, when the service that the receiver is currently receiving and the target service to which the receiver wants to switch belong to the same group, the current service includes control information of the target service. Therefore, when a service switching 501 occurs at frame n (501), the receiver can receive the target service at frame (n+1), which is the next frame. That is, since the control information acquired through an in-band signaling from the current service at frame n indicates control information of the next frame, the receiver can instantly receive the switched service at frame (n+1). Therefore, in the case of a continuous failure in decoding two P2 signals 505 and 507, the two frames can achieve faster zapping time in the scheme of the preferred embodiment than in the conventional signaling scheme depending on only the P2 signal.

Further, when the service being currently received and the target service to which switching is required belong to two different groups, the receiver uses the primary service in order to get control information of the target service. That is, the receiver acquires control information for the primary service by decoding the existing service at frame n, and acquires control information for the target service by receiving the primary service at frame (n+1). Therefore, from frame (n+2), the receiver can receive the switched service. Accordingly, in the case of a continuous failure in decoding the two P2 signals 505 and 507, the scheme of the preferred embodiment can achieve zapping time one frame faster than the conventional signaling scheme depending on only the P2 signal.

Figure 6:
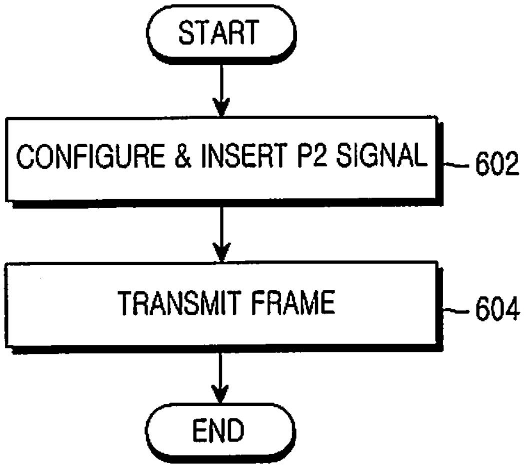
FIG. 6 is a flowchart illustrating the operation of a transmitter for transmitting a P2 signal in a broadcast communication system to which the present invention is applied.

Referring to FIG. 6, in order to enable a receiver to acquire control information for a target service when the receiver switches from a service being received to the target service, a transmitter needs to transmit a P2 signal including control information through a separate channel different from the data channel. Therefore, in step 602, the transmitter configures a P2 signal including control information indicating scheduling information for services and inserts the P2 signal in the frame. Then, in step 604, the transmitter transmits the frame including the P2 signal to the receiver.

Figure 7:
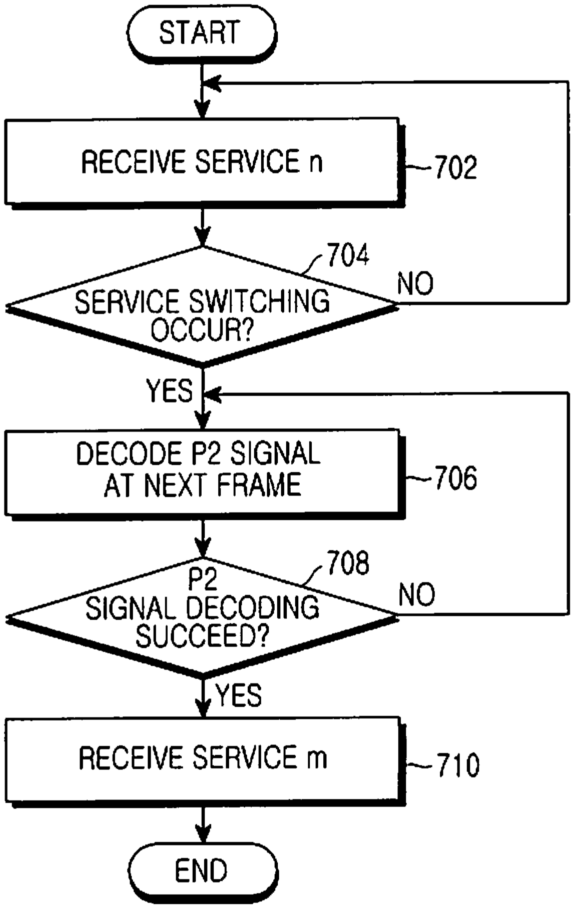
FIG. 7 is a flowchart illustrating the operation of a receiver for receiving a P2 signal in a broadcast communication system to which the present invention is applied.

Referring to FIG. 7, in step 702, the receiver receives service n at the current frame. Then, in step 704, the receiver determines if a service switching has occurred during receiving of service n. When a service switching has occurred during receiving of service n, the receiver decodes a P2 signal including control information for the switched service at the next frame in order to acquire the P2 signal in step 706. When a service switching has not occurred during the receiving of service n, the receiver returns to step 702, in which the receiver continuously receives service n.

In step 708, the receiver determines if the decoding of the P2 signal is successful. When the decoding of the P2 signal has been proved a failure, the receiver returns to step 706, in which the receiver tries to decode the P2 signal again. When the decoding of the P2 signal has been proved a success as a result of the determination in step 708, the receiver acquires control information for the target service m from the decoded signal P2 and receives the target service m at the location at which the target service m is transmitted at the next frame according to the control information in step 710.

Figure 8:
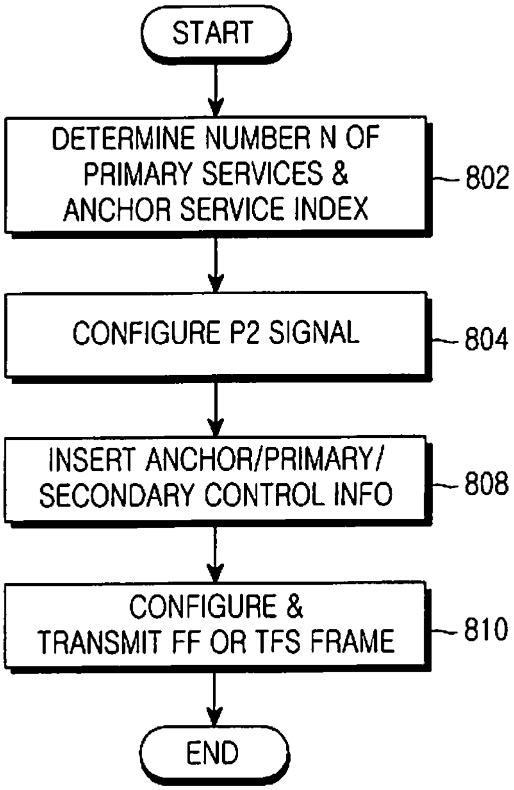
FIG. 8 is a flowchart illustrating the operation of a transmitter for transmitting control information according to the first embodiment of the present invention.

In FIG. 8, the transmitter transmits service data including control information according to the scheme as described above with reference to FIGS. 4A and 4B.

Referring to FIG. 8, in step 802, the transmitter determines the number N of primary services and parameters relating to the frame configuration, such as the index of an anchor service. Then, in step 804, the transmitter configures the P2 signal in consideration of the determined parameters. At this time, the number N of primary services may be predetermined between the transmitter and the receiver, in which case it is unnecessary to perform a separate signaling for the parameter N indicating the number of primary services. Further, in selecting one service from among the primary services as an anchor service, it is possible to use a service index predetermined between the transmitter and the receiver, which makes it unnecessary to perform a separate signaling of related information. For example, in an arrangement of indexes of N primary services according to the magnitude of the index number, the first index or the last index (corresponding to the anchor service in FIG. 4A) may be predetermined to be used for the anchor service.

In step 806, control information indicating scheduling information on other services to be included in each service according to its service type based on the classification criterion illustrated in FIG. 4A is inserted in each service data. In step 808, the transmitter configures a frame including the P2 signal and service data and transmits it to the receiver.

Figure 9:
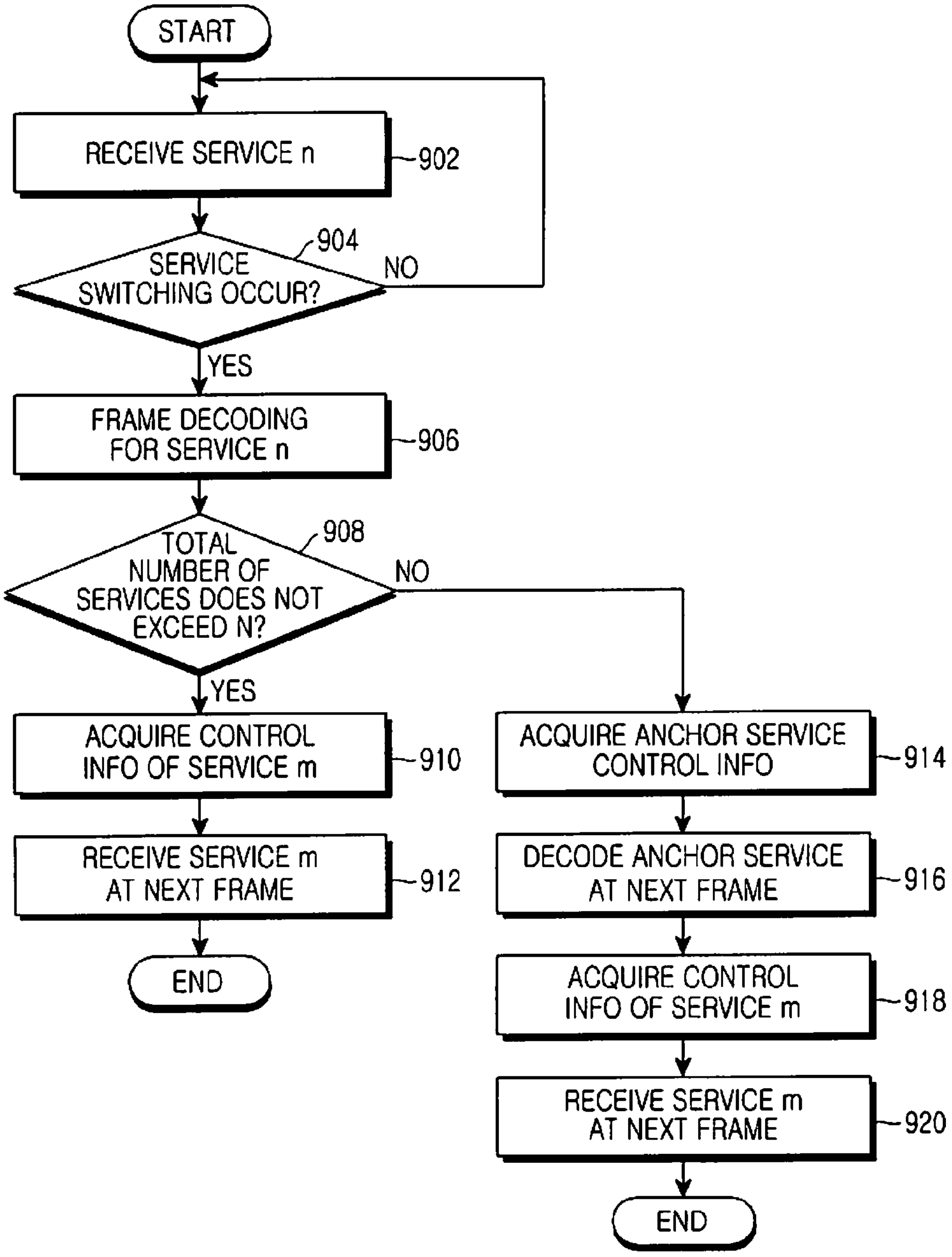
FIG. 9 is a flowchart illustrating the operation of a receiver for receiving control information according to the first embodiment of the present invention.

In FIG. 9, the receiver receives service data including control information according to the scheme as described above with reference to FIGS. 4A and 4B.

Referring to FIG. 9, in step 902, the receiver receives service n at frame n (i.e. at current frame). Then, in step 904, the receiver determines if a service switching to another service during the service receiving at frame n has occurred. When a service switching has not occurred, the receiver returns to step 902, in which the receiver continuously receives service n at the next frame. In contrast, when a service switching has occurred, the receiver proceeds to step 906, in which the receiver completes decoding of service n at the current frame. Thereafter, in step 908, the receiver compares the total number of the services transmitted from the transmitter with the number N of the primary services either pre-promised between the transmitter and the receiver or acquired through a separate signaling. When the total number of services does not exceed the number N of primary services, the receiver proceeds to step 910, in which the receiver acquires control information of service m, which is the target service, at the current frame n. Then, in step 912, the receiver receives service m by using the control information.

Meanwhile, as a result of the comparison in step 908, when the total number of services exceeds the number N of primary services, the receiver proceeds to step 914, in which the receiver acquires control information for the anchor service through the decoded service n. Then, in step 916, by using the control information for the anchor service, the receiver decodes the anchor service at the next frame, i.e. at frame (n+1). In step 918, the receiver acquires control information of service m from the decoded anchor service. In step 920, the receiver receives service m at the next frame, i.e. at frame (n+2), by using the control information.

Figure 10:
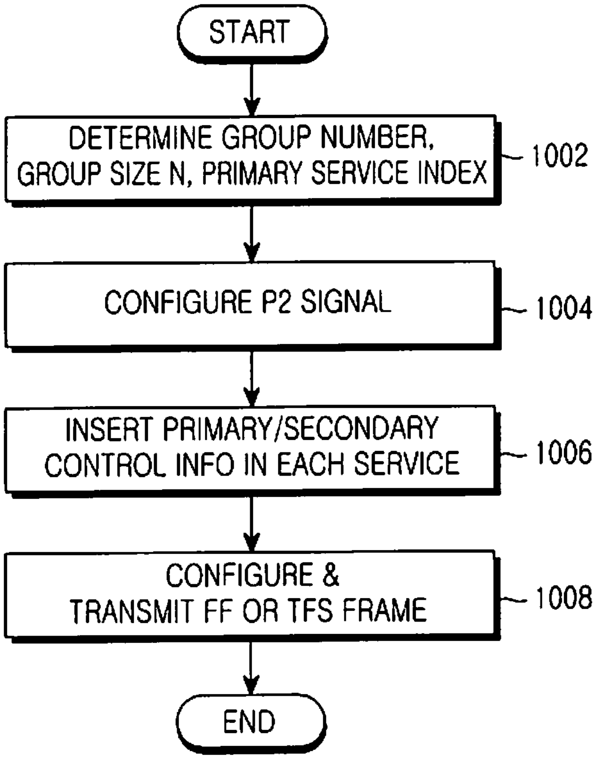
FIG. 10 is a flowchart illustrating the operation of a transmitter transmitting control information according to the second embodiment of the present invention.

In FIG. 10, in regard to the second embodiment, the transmitter transmits service data including control information according to the scheme as described above with reference to FIGS. 5A and 5B.

Referring to FIG. 10, in step 1002, the transmitter determines parameters relating to the frame configuration, such as the number of groups, the group size N, and an index of a primary service. In step 1004, the transmitter configures a P2 signal in consideration of the determined parameters. The group size N, which corresponds to the number of services included in each group, and the number of groups may be predetermined as a number promised between the transmitter and the receiver, in which case it is unnecessary to perform a separate signaling of the parameters relating to the number of groups and the group size. Further, in determining one service from among the services as a primary service, it is possible to use a service index predetermined between the transmitter and the receiver, which makes it unnecessary to perform a separate signaling of related information. For example, in an arrangement of indexes of (2N+1) service indexes according to the magnitude of the index, the first index or the last index (corresponding to the primary service in FIG. 5A) may be predetermined to be used for the primary service.

In step 1006, control information indicating scheduling information on other services to be included in each service according to the service type based on a standard set in FIG. 5A is inserted in each service data. That is, the service data of the primary service includes control information of all the services belonging to all of the groups. Further, service data of the secondary services belonging to each group includes control information of all the services belonging to the group. In step 1008, the transmitter transmits a frame including the P2 signal and service data including the control information to the receiver.

Figure 11:
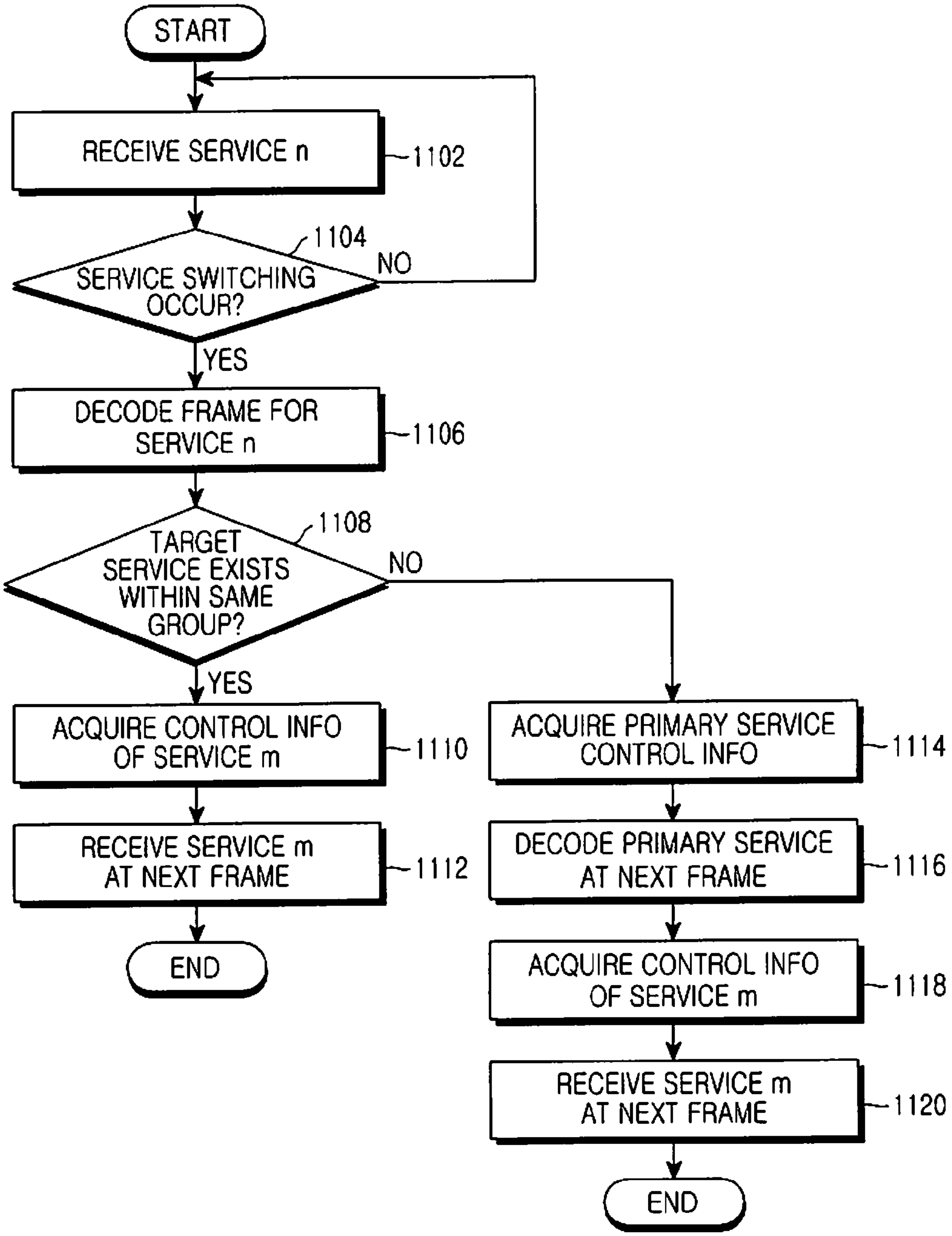
FIG. 11 is a flowchart illustrating the operation of a receiver for receiving control information according to the second embodiment of the present invention.

In FIG. 11, the receiver receives control information included in service data according to the scheme as described above with reference to FIGS. 5A and 5B.

Referring to FIG. 11, in step 1102, the receiver receives service n at frame n (i.e. at a current frame). Then, in step 1104, the receiver determines if service n switches to another service during the service receiving at frame n has occurred. When a service switching has not occurred, the receiver returns to step 1102, in which the receiver continuously receives service n at the next frame. In contrast, when a service switching has occurred, the receiver proceeds to step 1106, in which the receiver completes decoding of service n at the current frame. Thereafter, in step 1108, the receiver determines if service m, which is a target service to be newly received, exists within the same group as the group of the service n. As a result of the determination in step 1108, when the target service exists within the same group, the receiver proceeds to step 1110, in which the receiver acquires control information of service m at the current frame. Then, in step 1112, the receiver receives service m by using the control information.

Meanwhile, as a result of the determination in step 1108, when it is determined that service m belongs to a group different from the group of service n, the receiver proceeds to step 1114, in which the receiver acquires control information for the primary service through the decoding of service n. Then, in step 1116, by using the control information, the receiver decodes the primary service at the next frame, i.e. at frame (n+1). In step 1118, the receiver acquires control information of service m from the decoded primary service. In step 1120, the receiver receives service m at the next frame, i.e. at frame (n+2), by using the control information.

Figure 12:
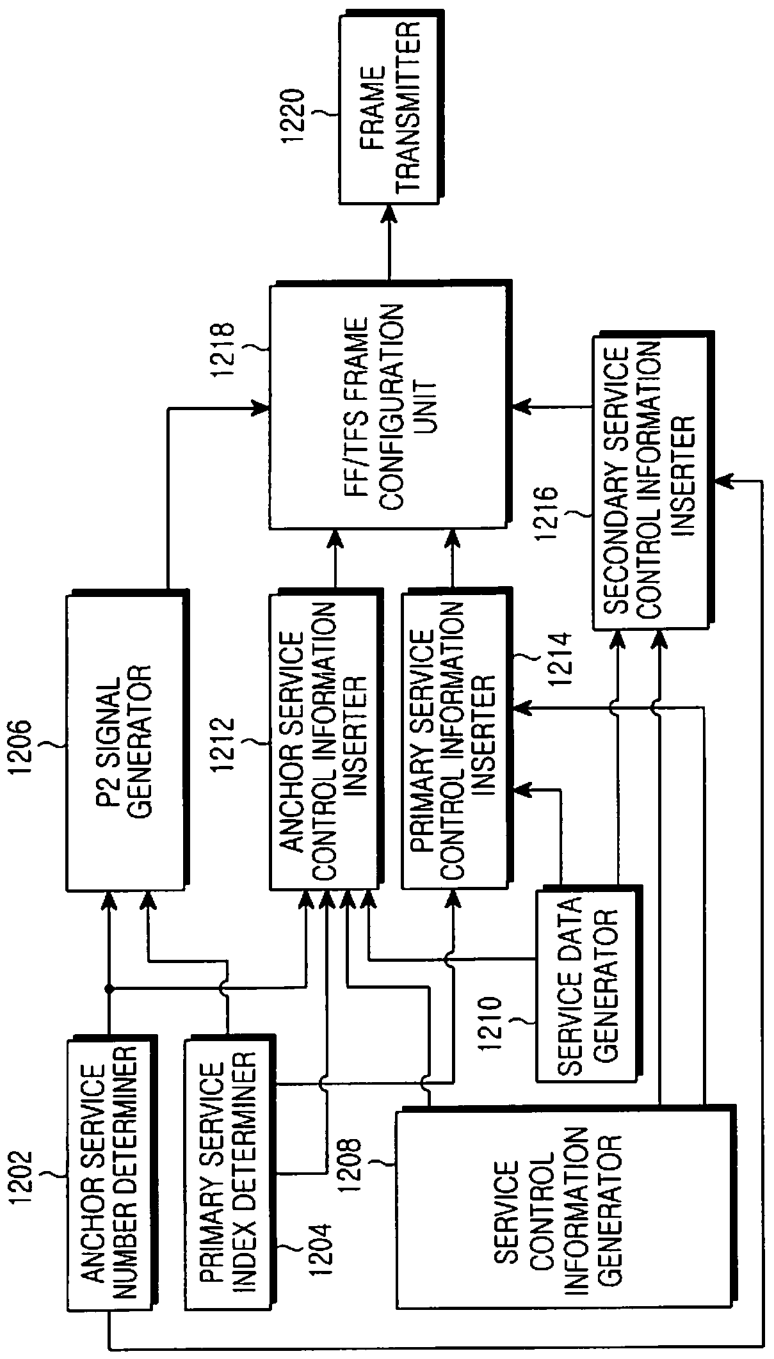
FIG. 12 is a block diagram illustrating the structure of a transmitter according to the first embodiment of the present invention.

The structure shown in FIG. 12 corresponds to a structure for performing the operation as shown in FIG. 8.

Referring to FIG. 12, a P2 signal generator 1206 generates a P2 signal by using the parameters determined by an anchor service index determiner 1202 and a primary service number determiner 1204. The anchor service control information inserter 1212 inserts control information, which is to be included in the anchor service, in the service data of the anchor service by using information input from the primary service number determiner 1201 and the anchor service index determiner 1202 and information input from a service control information generator 1208 and a service data generator 1210. The service control information generator 1208 generates control information indicating scheduling information of all the services for the anchor service.

Meanwhile, a primary service control information inserter 1214 inserts control information, which is to be included in the primary service, in the data of the primary service by using information input from the anchor service index determiner 1204, the service control information generator 1208, and the service data generator 1210. For the primary service, the service control information generator 1208 generates control information indicating scheduling information of all the primary services. Finally, a secondary service control information inserter 1216 inserts control information, which is to be included in the secondary service, in the data of the secondary service by using information input from the primary service number determiner 1202, the service control information generator 1208, and the service data generator 1210. For the secondary service, the service control information generator 1208 generates control information indicating scheduling information of the anchor service and a pertinent secondary service.

An FF/TFS frame configuration unit 1218 configures an FF or TFS frame by using service data of all the services in which the control information has been inserted, together with a P2 signal. A frame transmitter 1220 transmits the configured FF or TFS frame to a receiver.

Figure 13:
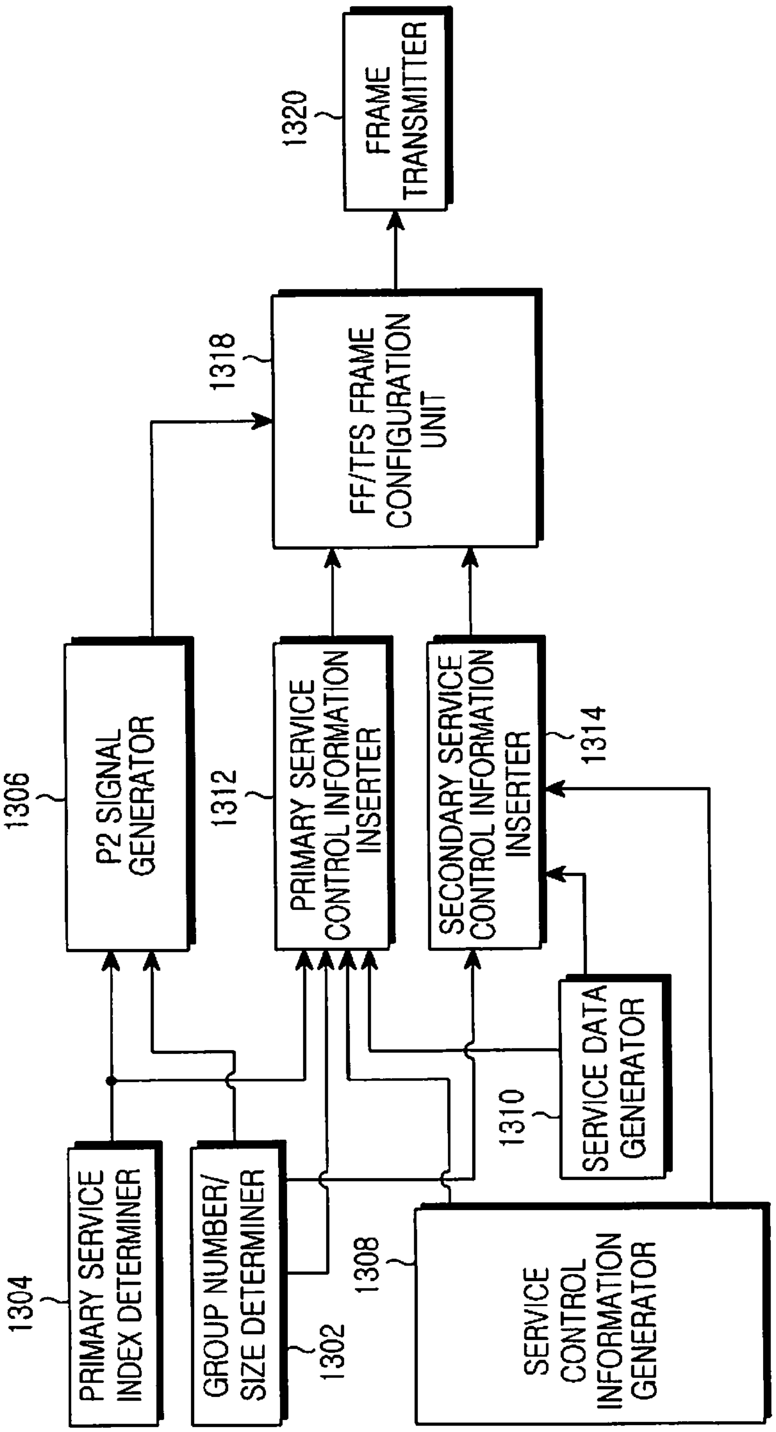
FIG. 13 is a block diagram illustrating the structure of a transmitter according to the second embodiment of the present invention.

The structure shown in FIG. 13 corresponds to a structure for performing the operation described in FIG. 10.

Referring to FIG. 13, a P2 signal generator 1306 generates a P2 signal by using the parameters determined by a primary service index determiner 1304 and a group number/size determiner 1302. The primary service control information inserter 1312 inserts control information, which is to be included in the primary service, in the service data of the primary service by using information input from the primary service index determiner 1304 and information input from a service control information generator 1308 and a service data generator 1310. The service control information generator 1308 generates control information indicating scheduling information of all the services including the primary service for the primary service.

Meanwhile, a secondary service control information inserter 1314 inserts control information, which is to be included in the secondary service, in the data of the secondary service by using information input from the group number/size determiner 1302, the service control information generator 1308, and the service data generator 1310. For each secondary service, the service control information generator 1308 generates scheduling information of all the services (i.e. all the secondary services and the primary service) within the group including the secondary service.

Further, an FF/TFS frame configuration unit 1318 configures an FF or TFS frame by using service data of all the services in which the control information has been inserted, together with a P2 signal. A frame transmitter 1320 transmits the configured FF or TFS frame to a receiver.

Figure 14:
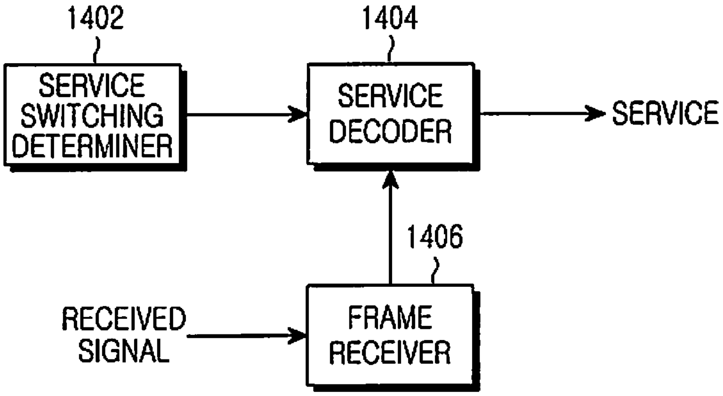
FIG. 14 is a block diagram illustrating a structure of a receiver according to the present invention.

Referring to FIG. 14, the frame receiver 1406 receives a frame transmitted from the transmitter and delivers the received frame to the service decoder 1404, and the service switching determiner 1402 determines if a service switching to a target service has occurred during reception of the service at the frame.

For the first embodiment described above with reference to FIG. 9, the service decoder 1404 decodes the service at the current frame and acquires control information for the anchor service or target service from the decoded service. When the total number of services exceeds the number of primary services, the service decoder 1404 decodes the anchor service by using the acquired control information for the anchor service, and acquires control information for the target service from the decoded anchor service. Then, the service decoder 1404 receives the target service by using the control information for the target service.

For the second embodiment described above with reference to FIG. 11, the service decoder 1404 decodes the service at the current frame and acquires control information for the primary service or target service from the decoded service. When the target service belongs to a group different from the group including the current service, the service decoder 1404 decodes the primary service by using the control information for the primary service, and then acquires control information for the target service from the decoded primary service. Then, the service decoder 1404 receives the target service by using the control information for the target service.

According to the present invention, it is possible to efficiently transmit and receive a frame, which includes multiple services configured through a combination of one or more RFs. Therefore, the present invention enables rapid receiving of a switched service in the case of service switching.

While the invention has been shown and described with reference to certain embodiments thereof, it will be understood by those skilled in the art that various changes in form and details may be made therein without departing from the spirit and scope of the invention as defined by the appended claims.

The invention claimed is:

1. A method of transmitting control information in a broadcast communication system, the method comprising the steps of:

inserting first control information for receiving at least one different service at a next frame in each of multiple service data pieces of a current frame; and transmitting a frame including the first control information.

2. The method of claim 1, wherein the frame including the first control information includes each of the multiple service data pieces of the current frame, and includes second control information for receiving the multiple service data pieces provided at the current frame, the second control information being located at a front part of the frame including the first control information.

3. The method of claim 1, wherein, when a number of multiple services provided through the broadcast communication system does not exceed a predetermined number, the first control information includes scheduling information for all multiple services provided at the next frame.

4. The method of claim 1, wherein, when a number of multiple services provided through the broadcast communication system exceeds a predetermined number, the multiple services provided through the broadcast communication system are divided into primary services and secondary services, and the first control information is inserted in a particular service data piece from among the multiple service data pieces belonging to a primary service comprising scheduling information for all the multiple services.

5. The method of claim 4, wherein the first control information inserted in other service data pieces except for the particular service data piece from among the multiple service data pieces belonging to the primary service comprises scheduling information for all the multiple service data pieces belonging to the primary service.

6. The method of claim 4, wherein the first control information inserted in each of multiple service data pieces belonging to each of the secondary services includes scheduling information for service data pieces of the secondary service and the particular service data piece.

7. The method of claim 1, wherein the multiple services provided through the broadcast communication system are divided into multiple groups commonly comprising a particular service, and the first control information inserted in service data pieces of the particular service includes scheduling information for all the multiple services.

8. The method of claim 7, wherein the first control information inserted in each service data piece of other services except for the particular service in each of the groups includes scheduling information for services of the corresponding group.

9. A method of receiving control information in a broadcast communication system, the method comprising the steps of:

receiving a current frame including multiple service data pieces, each of the multiple service data pieces having inserted therein first control information for receiving at least one different service at a next frame;

acquiring the first control information from the received current frame when a service switching occurs; and receiving service data of the switched service by using the first control information.

10. The method of claim 9, wherein the current frame including the first control information includes multiple service data pieces for multiple services and second control information for receiving the multiple service data pieces provided at the current frame, the second control information being located at a front part of the frame including the first control information.

11. The method of claim 9, wherein the step of acquiring the first control information comprises:

completing a decoding of service data, which was being received before a service switching, at the received current frame when the service switching occurs; and acquiring the first control information from the decoded service data.

12. The method of claim 11, wherein, when a number of multiple services provided through the broadcast communication system exceeds a predetermined number, the multiple services provided through the broadcast communication system are divided into primary services and secondary services, and the step of acquiring the first control information includes:

identifying the number of the multiple services; and acquiring first scheduling information for receiving a particular service from among the primary services as the first control information from the decoded service data when the number of the multiple services exceeds the predetermined number.

13. The method of claim 12, wherein the step of receiving service data of the switched service comprises, with the current frame being frame n and the next frame being frame (n+1):

decoding service data of the particular service at frame (n+1) based on the first control information;

acquiring second scheduling information for receiving the switched service from service data of the decoded particular service; and receiving service data of the switched service at frame (n+2) based on the acquired second scheduling information.

14. The method of claim 11, wherein, when multiple services provided through the broadcast communication system are divided into multiple groups commonly comprising a particular service, the step of acquiring the first control information comprises:

determining if the switched service exists within a group to which a service of the service data belongs; and acquiring first scheduling information for receiving a particular service as the first control information from the decoded service data when the switched service does not exist within the group to which the service of the service data belongs.

15. The method of claim 14, wherein the step of receiving service data of the switched service comprises, with the current frame being frame n and the next frame being frame (n+1):

decoding service data of the particular service at frame (n+1) based on the first control information;

acquiring second scheduling information for receiving the switched service from service data of the decoded particular service; and receiving service data of the switched service at frame (n+2) based on the acquired second scheduling information.

16. An apparatus for transmitting control information in a broadcast communication system, the apparatus comprising:

a control information processing unit for generating first control information for receiving at least one different service at a next frame and inserting the first control information in each of multiple service data pieces of a current frame; and a transmission unit for configuring a frame including the first control information in a predetermined format and transmitting the frame.

17. The apparatus of claim 16, wherein the control information processing unit generates second control information for receiving each of the multiple service data pieces at the current frame and inserts the second control information in a front part of the frame including the first control information.

18. The apparatus of claim 16, wherein, when a number of multiple services provided through the broadcast communication system does not exceed a predetermined number, the first control information includes scheduling information for all multiple services provided at the next frame.

19. The apparatus of claim 16, wherein, when a number of multiple services provided through the broadcast communication system exceeds a predetermined number, the multiple services provided through the broadcast communication system are divided into primary services and secondary services, and the first control information inserted in a particular service data piece from among the multiple service data pieces belonging to a primary service includes scheduling information for all the multiple services.

20. The apparatus of claim 19, wherein the first control information inserted in the other service data pieces except for the particular service data piece from among the multiple service data pieces belonging to the primary service includes scheduling information for all the multiple service data pieces belonging to the primary service.

21. The apparatus of claim 19, wherein the first control information inserted in each of multiple service data pieces belonging to each of the secondary services includes scheduling information for service data pieces of the secondary service and the particular service data piece.

22. The apparatus of claim 16, wherein the multiple services provided through the broadcast communication are divided into multiple groups commonly comprising a particular service, and the first control information inserted in service data pieces of the particular service includes scheduling information for all the multiple services.

23. The apparatus of claim 22, wherein the first control information inserted in each service data piece of the other services except for the particular service in each of the groups includes scheduling information for services of the corresponding group.

24. An apparatus for receiving control information in a broadcast communication system, the apparatus comprising:

a frame receiving unit for receiving a current frame includes multiple service data pieces, each of which having inserted therein first control information for receiving at least one different service at a next frame;

a service switching determiner for determining if a service switching to another service occurs during receiving of a service at the current frame; and a service decoder for acquiring the first control information from the received current frame when the service switching occurs, and receiving service data of the switched service by using the first control information.

25. The apparatus of claim 24, wherein the current frame including the first control information includes the multiple service data pieces for multiple services and second control information for receiving the multiple service data pieces provided at the current frame, the second control information being located at a front part of the frame including the first control information.

26. The apparatus of claim 24, wherein the service decoder completes a decoding of service data, which was being received before a service switching, at the received current frame when the service switching occurs, and the service decoder acquires the first control information from the decoded service data.

27. The apparatus of claim 26, wherein, when a number of multiple services provided through the broadcast communication system exceeds a predetermined number, the multiple services provided through the broadcast communication system are divided into primary services and secondary services, and the service decoder acquires first scheduling information for receiving a particular service from among the primary services as the first control information from the decoded service data when the number of the multiple services exceeds a predetermined number.

28. The apparatus of claim 27, wherein, with the current frame being frame n and the next frame being frame (n+1), the service decoder decodes service data of the particular service at frame (n+1) based on the first control information, acquires second scheduling information for receiving the switched service from service data of the decoded particular service, and receives service data of the switched service at frame (n+2) based on the second scheduling information.

29. The apparatus of claim 26, wherein, when multiple services provided through the broadcast communication system are divided into multiple groups commonly comprising a particular service, the service decoder determines if the switched service exists within a group to which a service of the service data belongs, and acquires first scheduling information for receiving a particular service as the first control information from the decoded service data when the switched service does not exist within the group to which the service of the service data belongs.

30. The apparatus of claim 29, wherein, with the current frame being frame n and the next frame being frame (n+1), the service decoder decodes service data of the particular service at frame (n+1) based on the first control information, acquires second scheduling information for receiving the switched service from service data of the decoded particular service, and receives service data of the switched service at frame (n+2) based on the acquired second scheduling information.

* * * * *